United States Patent Office 2,829,991
Patented Apr. 8, 1958

2,829,991
METHOD OF STERILIZING STARCH GRANULES WITH ETHYLENE OXIDE

James W. Evans and Glen E. Nelson, Highland, Ind., assignors to American Maize Products Company, a corporation of Maine No Drawing. Application June 20, 1956
Serial No. 592,511

6 Claims. (Cl. 127—71)

This invention relates to a process for sterilizing granules with ethylene oxide to kill bacteria and other micro-organisms.

As is known, ethylene oxide in the form of a gas is now used for sterilizing starch granules to kill bacteria and other micro-organisms but the process is expensive to carry out and special precautions and equipment are necessary for handling the ethylene oxide gas which becomes highly explosive when mixed with air.

In accordance with the present invention an inexpensive but highly effective process has been developed for sterilizing starch with ethylene oxide which is safe to use and the process may be carried out with just minor changes in existing plant equipment. Briefly stated in carrying out the present invention, ethylene oxide is dissolved in water in such small amounts that little if any gas escapes to the atmosphere. Treatment of the starch granules is very simply achieved by slurrying the granules in water containing as little as 2% ethylene oxide gas in solution and then the slurry is dewatered and resulting starch cake dried to about 12% moisture content. The ease with which the process is carried out and its efficiency is truly surprising and in actual tests the starch granules were shown to have retained substantially all of their natural physical characteristics and the bacteria level of the starch fully satisfied National Canners' Association standards.

The reason why such very small amounts of ethylene oxide should be so highly effective in destroying bacteria and micro-organisms without substantially affecting the physical characteristics of the starch granules is not yet fully understood. It may well be that the starch is so widely dispersed in water that each granule is individually treated with ethylene oxide so that only a small amount of reagent is required as compared to the large amounts used where ethylene oxide gas is forced to penetrate through a mass of starch placed in a gas chamber. On the other hand it may well be that in aqueous slurry the water is effective for washing the bacteria and micro-organisms out of the starch granules and then the bacteria and micro-organisms may be subsequently killed as the liquid is dried and ethylene oxide becomes concentrated. Regardless of the exact mechanism of the way in which the ethylene oxide works in our process, it is a fact that the present process is very simply carried out and the cost of treating the starch is low as compared to commercial processes currently in use where starch is treated with ethylene oxide in the form of a gas.

Any of the known starches may be employed in the present process such as tapioca, potato, wheat, waxy and ordinary corn starch. So called modified starches which have been pretreated in known manner with chemical reagents may be used in the present process. Other grain may also be used in the process as long as the grain can withstand being slurried in water and then dried without detriment to physical characteristics that are important for the purpose for which the grain is intended. The concentration of starch solids in aqueous slurry may be varied to meet existing plant operation and ordinarily the starch solids will constitute about 10 to 45% by weight of the slurry.

As to the ethylene oxide, only very small amounts of ethylene oxide are required in the process of the present invention and best results are achieved when the slurry contains about 0.5 to 2.0% ethylene oxide by weight of starch solids (dry basis) in the slurry. Additional amounts of ethylene oxide up to 5.0% by weight may be used but this is not necessary and it only adds to the cost of the process. The ethylene oxide may be added in the form of a gas or liquid whichever may be most convenient. If ethylene oxide gas is used the gas is released very slowly under water so that substantially all of the gas will dissolve in water and in the interest of safety the flow of gas is controlled to prevent any substantial amount of gas from escaping to the atmosphere. The temperature of the starch slurry that is used is that which exists in ordinary plant operation and the temperature of the slurry is preferably kept below about 120° F. Time of treatment will vary depending upon temperature and amount of ethylene oxide in solution and excellent results have been achieved by maintaining the starch in aqueous slurry at ordinary room temperature for as little as 20 minutes to as much as 24 hours. Drying the starch slurry to about 12% moisture content by weight is carried out in accordance with existing plant practice and in the usual case this involves a dewatering operation followed by drying the starch cake in ovens by means of warm dehumidified air. During the drying operation temperature of the starch is maintained slightly below the point at which the starch will paste and preferably the starch temperature is kept below about 165° F.

The following specific examples are given to further illustrate the present invention. Unless otherwise specified, percentages are calculated on a weight basis.

EXAMPLE 1

43,000 pounds of modified waxy corn starch were slurried in 57,000 pounds of water and 400 pounds of ethylene oxide were added. The slurry was held at a temperature of about 100° F. for about 3 hours. After this, slurry was dewatered and starch cake dried at a temperature of about 140° F. to about 12% moisture content. The resulting sterilized starch was recovered in granular form. A control batch was subsequently run using the same procedure ingredients and proportions of ingredients as above but no ethylene oxide was added to the control. The following results were obtained:

*Bacteriological test*

|  | Control | Example 1 |
|---|---|---|
| Ethylene Oxide | 0.0 | 0.93 |
| Flat Sour Spores/10 g | *TMC | 5.0 |
| Total Thermophiles/10 g | *TMC | 5.0 |
| Anaerobes H$_2$S formers | 12 | 0 |
| Anerobes, Non H$_2$S formers | 12 | 0 |

* Too many to count.

Viscosity characteristics of the starch granules were determined by making up an aqueous slurry of starch containing 5% starch solids by weight of slurry. The slurry was cooked to paste the starch granules and then cooked in an autoclave at 15 pounds per square inch for 45 minutes. Pressure was then released and the hot paste was transferred to a Corn Industries viscometer and viscosities determined at 140° F. and 77° as follows:

|  | Control | Example 1 |
|---|---|---|
| Viscosity, g. cm.: |  |  |
| 140° F | 760 | 805 |
| 77° F | 1,140 | 1,138 |

The starch pastes were allowed to stand for 16 hours at 75° F. and gel strengths of both the control and treated starch were tested and found to be normal and substantially the same. In taste tests the flavor of both the control and treated starch was bland and the treated starch did not exhibit any off flavor characteristics. The bacteriological test of the treated starch given above fully satisfied National Canners' Association standards for thermophiles and the method employed for testing for thermophiles was that described in QMC Technical Bulletin No. 1, Bacterial standards for starches, flours, cereals, and sugars used in the preparation of canned foods for the U. S. Army, Chicago, QMC Depot (July 30, 1942).

The National Canners' Association have set the following standard for starch.

*Flat sours.*—Maximum of 75 spores for any one 10 gram sample of starch.

*Total thermophiles.*—Maximum of 150 spores for any one 10 gram sample of starch.

*Anaerobes not producing* $H_2S$.—Not over 3 of 5 samples positive.

*Anaerobes producing* $H_2S$.—Not more than 5 spores per 10 grams in any one sample.

EXAMPLE 2

400 pounds of ethylene oxide were added to a modified waxy cornstarch slurry containing 60,000 pounds of starch solids (38% by weight of slurry) in water. The slurry was held at 90° F. for 3 hours and at the end of this time, starch was recovered by dewatering and drying as in Example 1. The resulting treated starch granules fully met National Canners' Association's specifications for thermophiles and physical characteristics including flavor showed no change from control batch.

EXAMPLE 3

400 pounds of ethylene oxide were added to an unmodified waxy corn starch slurry containing 60,000 pounds starch solids in 90,000 pounds of water. The slurry was held at 100° F. for four hours and starch granules were recovered and dried to about 12% moisture content as specified in Example 1. The starch tested as follows:

Flat sour spores/10 g ----------------------------- 10
Total thermophiles/10 g --------------------------- 10
Anaerobes, $H_2S$ formers ------------------------ 0
Anaerobes, non $H_2S$ formers -------------------- 0

The starch granules fully satisfied National Canners' Association standards for thermophiles. Autoclaved pastes of treated starch and of a control batch were made up and tested as in Example 1 and the viscosity of the treated starch was the same as the viscosity of the starch of the control batch. Flavor of the treated starch was bland and there was no off flavor detected.

EXAMPLE 4

Four hundred pounds of ethylene oxide were added to a 38% solids corn starch slurry containing 40,000 pounds starch solids. The slurry was held at a temperature of about 70° to 100° F. for four hours and then the slurry was dewatered and starch cake dried in a flash drier. The resulting sterilized starch granules were tested as follows:

Flat sour spores/10 g ----------------------- 0 to 10
Total thermophiles/10 g --------------------- 0 to 10
Anaerobes non $H_2S$ formers ---------------- 0
Anaerobes $H_2S$ formers -------------------- 0

Viscosity of autoclave pastes determined as in Example 1 of treated starch and untreated starch of control batch were substantially the same and the flavor of both starches was bland.

It will be understood that it is intended to cover all changes and modifications of the preferred form of the present invention herein chosen for the purpose of illustration which do not constitute departures from the spirit and scope of the invention.

We claim:

1. A method of treating starch granules to kill bacteria and micro-organisms which comprises the steps of adding starch granules to water to form an aqueous suspension of starch in which the granules are widely dispersed as individual particles, adding ethylene oxide to the aqueous suspension in the proportion between about 0.5% to 5.0% of ethylene oxide by weight of starch solids, maintaining the starch granules in aqueous slurry in the presence of the ethylene oxide from about 20 minutes to about 24 hours and then drying the slurry at a temperature below the pasting point of the starch granules to recover granules containing less than 75 flat sour spores for any one 10 gram sample.

2. A method as specified in claim 1 in which the starch slurry contains about 10 to 45 percent starch solids.

3. A method as specified in claim 1 which includes the step of adding ethylene oxide in the form of a gas.

4. A method as specified in claim 1 which includes the step of adding ethylene oxide in the form of a liquid.

5. A method of treating starch granules to kill bacteria which comprises the steps of adding starch granules to water to form an aqueous suspension of starch containing about 10 to 45% starch solids by weight of slurry in which the granules are widely dispersed as individual particles, adding ethylene oxide to the slurry in the proportion of about 0.5% to 2.0% by weight of starch solids, maintaining the starch granules in aqueous slurry in the presence of the ethylene oxide from about 20 minutes to about 24 hours and then drying the starch at a temperature below the pasting point of the starch granules to recover granules containing less than 75 flat sour spores for any one 10 gram sample.

6. A method of treating starch granules to kill bacteria which comprises the steps of adding starch granules to water to form an aqueous suspension of starch containing about 10 to 45% starch solids by weight of slurry in which the granules are widely dispersed as individual particles, adding ethylene oxide to the slurry in the proportion of about 0.5% to 2.0% by weight of starch solids, maintaining the starch granules in aqueous slurry in the presence of the ethylene oxide from about 20 minutes to about 24 hours, dewatering the slurry and applying heat to dry the slurry to produce treated starch granules having substantially the same physical characteristics of the untreated starch granules and said treated granules being substantially free of thermophile bacteria.

References Cited in the file of this patent

UNITED STATES PATENTS

| | | |
|---|---|---|
| 2,075,845 | Gross et al. | Apr. 6, 1937 |
| 2,107,697 | Griffith et al. | Feb. 8, 1938 |
| 2,189,947 | Griffith et al. | Feb. 13, 1940 |
| 2,516,632 | Kesler et al. | July 25, 1950 |
| 2,516,633 | Kesler et al. | July 25, 1950 |